(12) United States Patent
Smith et al.

(10) Patent No.: US 11,377,305 B2
(45) Date of Patent: Jul. 5, 2022

(54) DUAL-TUBE CORE SCRAPER BLADE FOR A CONVEYOR BELT SYSTEM

(71) Applicant: Richwood Industries, Inc., Huntington, WV (US)

(72) Inventors: Christopher Scott Smith, Huntington, WV (US); Glenn E. Farrow, Barboursville, WV (US)

(*) Notice: Subject to any disclaimer, the term of this patent is extended or adjusted under 35 U.S.C. 154(b) by 184 days.

(21) Appl. No.: 16/920,839

(22) Filed: Jul. 6, 2020

(65) Prior Publication Data

US 2022/0002093 A1    Jan. 6, 2022

(51) Int. Cl.
*B65G 45/16* (2006.01)
*B29C 43/18* (2006.01)

(52) U.S. Cl.
CPC .............. *B65G 45/16* (2013.01); *B29C 43/18* (2013.01); *B29C 2043/181* (2013.01); *B29C 2043/185* (2013.01)

(58) Field of Classification Search
None
See application file for complete search history.

(56) References Cited

U.S. PATENT DOCUMENTS

| | | | |
|---|---|---|---|
| 3,913,728 A | 10/1975 | Pott | |
| 4,533,036 A * | 8/1985 | Gordon | B65G 45/16 15/256.51 |
| 5,628,392 A | 5/1997 | Stoll et al. | |
| 5,975,281 A * | 11/1999 | Yoshizako | B65G 45/12 198/499 |
| 6,056,111 A | 5/2000 | Stoll et al. | |
| 6,321,901 B1 | 11/2001 | Strebel et al. | |
| 6,991,088 B1 | 1/2006 | Smith et al. | |
| 8,556,064 B2 * | 10/2013 | Smith | B65G 45/12 198/497 |
| 9,162,827 B2 | 10/2015 | Brunone | |
| 9,415,946 B2 * | 8/2016 | Smith | B65G 45/12 |

FOREIGN PATENT DOCUMENTS

| | | |
|---|---|---|
| CN | 202163866 U | 3/2012 |
| DE | 102005035522 A1 | 2/2007 |
| EP | 2522601 A1 | 11/2012 |
| GB | 2012234 | 7/1979 |
| KR | 10-0863066 B1 | 5/2007 |
| KR | 20130046592 | 5/2013 |
| KR | 20160001520 | 5/2016 |
| KR | 101630288 B1 | 6/2016 |
| KR | 10-2019-0016654 A | 2/2019 |
| WO | 2013105111 A1 | 7/2013 |

OTHER PUBLICATIONS

International Search Report and Written Opinion pertaining to International Application No. PCT/US2021/040134 filed Jul. 1, 2021, dated Oct. 6, 2021.

* cited by examiner

*Primary Examiner* — Kavel Singh
(74) *Attorney, Agent, or Firm* — Dinsmore & Shohl LLP; Monika L. Jaensson, Esq.

(57) ABSTRACT

A scraper blade for a conveyor belt system, the blade having a pair of parallel tubes in a core region of the blade, integrally molded into elastomeric material. A plurality of spacers are provided to maintain the tubes in parallel arrangement during the molding process. End mounts are secured to the ends of the tubes to facilitate mounting on holders of the conveyor belt system.

20 Claims, 3 Drawing Sheets

DUAL-TUBE CORE SCRAPER BLADE FOR A CONVEYOR BELT SYSTEM

BACKGROUND

The disclosed technology regards a scraper blade for a conveyor belt system, the blade including a pair of tubes integrally molded in an elastomeric body; the disclosed technology further regards a method of manufacturing a dual-tube scraper blade.

Presently, scraper blades for conveyor belt systems include an elastomeric material formed about or attached to a single round tube. Drawbacks with these prior art scraper blades include significant weight, and separation of the tube from the elastomeric material due to torque loading from operation of the conveyor belt system. Specifically, after significant torque loading, over time the bond between the elastomer body of the blade separates from the round tube, allowing it to spin on the tube (and thereby cease operating effectively).

SUMMARY DESCRIPTION

The dual tube core design of the scraper blade of the disclosed technology provides significant structural integrity over single tube scraper blades, allowing the use of thinner-walled tubing, and achieving a significant weight reduction in the blade. Further, the large area occupied by the tubes reduces the amount of rubber in the blade core, further reducing the blade weight.

The dual tube design of the disclosed technology further adds a resistance to torque loading, not realized by a single round tube of the prior art, thereby extending the life of the blade on a conveyor system.

The disclosed technology generally provides a scraper blade for a conveyor belt system, the blade having a pair of tubes, positioned in a parallel arrangement. A plurality of spacers are positioned about the circumference of and along the length of the tubes, the spacers having a pair of vertically aligned apertures, each aperture receiving one of the tubes. The ends of the tubes are secured to end mounts, each of the end mounts including a plate with a pair of bosses extending from an interior surface of the plate, the bosses being received in the end of the tubes. The tubes are integrally molded into a core region of an elastomeric body, the elastomeric body further comprising a first wear region, a second wear region and a core region joining said first wear region and said second wear region generally in opposition to each other.

The disclosed technology also provides a scraper blade for a conveyor belt system, the blade including a pair of tubes, a pair of end mounts coupled with the tubes to secure the tubes in a parallel arrangement, and an elastomeric body. The tubes are integrally molded into a core region of the elastomeric body, with a wear region of the elastomeric body extending below the core region.

The disclosed technology further includes a method of manufacturing a scraper blade for a conveyor belt system, the method including the steps of: (a) in a mold, providing a pair of tubes in parallel arrangement; (b) adding elastomeric material to the mold; and (c) molding the elastomeric material about the tubes to form a core region, and further forming at least one wear region extending from the core region.

DETAILED DESCRIPTION

Figure 1A:
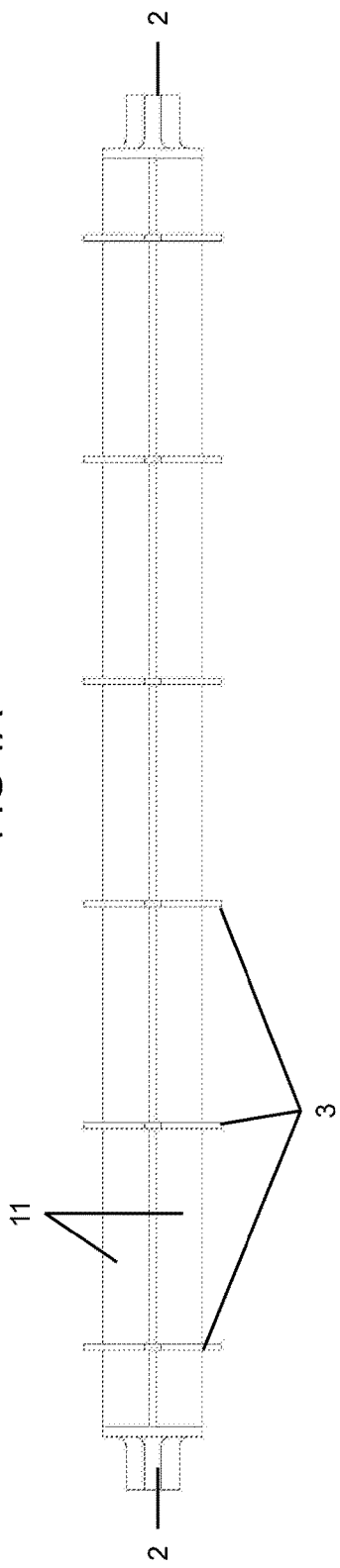
FIG. 1A shows a side view of an embodiment of an assembled core of the disclosed technology, with end mounts.
Figure 1B:
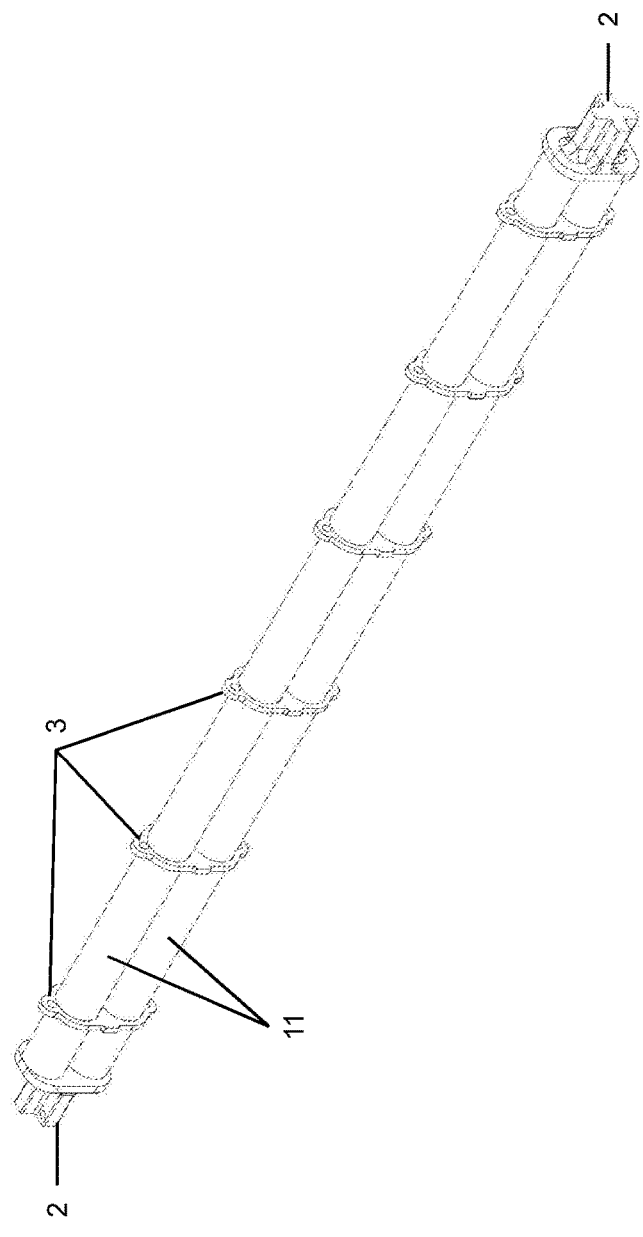
FIG. 1B shows a perspective view of the embodiment of the assembled core, with end mounts, of FIG. 1A.

As depicted in the embodiments shown in the Figures, the disclosed technology provides a scraper blade for a conveyor belt system, the blade including a pair of tubes 11, positioned in a parallel arrangement (see, FIGS. 1A and 1B). A plurality of spacers 3 may be positioned about the circumference of and along the length of the tubes, holding the tubes in their parallel arrangement separated by a small distance. The tubes may be further secured at their ends by a pair of end mounts 2, which further provide means to mount the blade to its holder in a conveyor belt system. An elastomeric body 4 is molded about the tubes in a core region 41, which core region extends to a first wear region 42 and in some embodiments joins with a second wear region 43 of the elastomeric body, generally in opposition to the first wear region (see FIGS. 2A, 2B and 2C).

Tubes 11 useful in the blade of the disclosed technology may be wholly or partially hollow, to receive bosses affixed to or integral with the end mounts 2, as hereinafter described. In an embodiment, the tubes have a thickness of about 0.25". In a similar embodiment, the tubes have and outer diameter of about 1.75", and an inner diameter of about 1.50". The tubes may be made from steel, a light weigh alloy, or a composite material. Exemplary light weight alloys include aluminum and titanium; exemplary composite materials include carbon fiber and fiberglass.

Figure 3B:
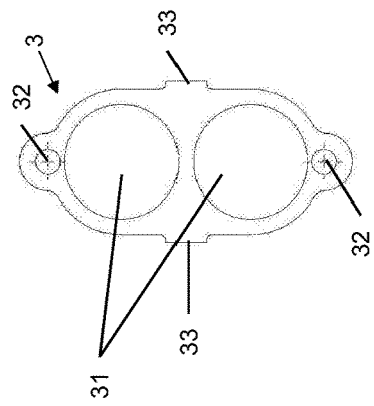
FIG. 3B shows a side view of the embodiment of the spacer of FIG. 3A.
Figure 3A:
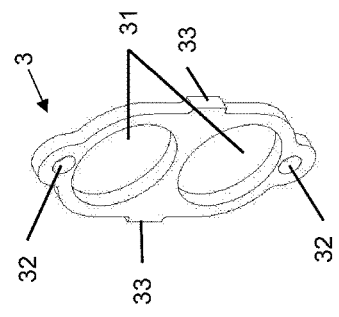
FIG. 3A shows a perspective view of an embodiment of a spacer useful in the disclosed technology.

As shown in FIGS. 3A and 3B, spacers 3 useful in the disclosed technology include a pair of vertically aligned apertures 31, each aperture being sized to slidingly receive one of the tubes. Based upon the position of the apertures and as shown in FIGS. 1A and 1B, when the spacers are positioned about the circumference of and along the length of the tubes (the tubes being received within the apertures of the spacers), the same cause the tubes to be a distance apart, such as a distance between 1.75" and 2.25". The number of spacers and spacing between the spacers along the length of the tubes may vary, depending on the length of the blade. For example, 6 spacers positioned 8" apart may be presented on a 48" blade, or 7 spacers positioned 9" apart may be presented on a 60" blade.

In the embodiment shown, positioned on at least one of the sides of each spacer 3 is a tab 33. The tab may extend about 0.125" to 0.25" from the corresponding spacer side, and have a straight edge or flat surface with a length of between about 0.375" and 0.75". When the spacers are positioned along the length of the tubes, the tubes may be supported in a mold in parallel arrangement, with the flat surface of the tabs in contact with the base of the mold to support the tubes as the elastomeric body is formed about the tubes, as hereinafter described. Further, as the spacers are also at least partially molded into the elastomeric body of the blade as hereinafter described, they further strengthen the blade.

The spacers 3 may include one or more small apertures 32 at the top, bottom, or both positions. These small apertures are sized to receive and support a tube, such as a ¼" diameter copper tube, within the core of the blade. After the blade is molded, the tube may be used to receive a fiber optic waveguide. In practice, as the scraper blade wears past the copper tube, it will shred the waveguide, thereby providing means to signal an operator that the blade is worn (light signals cease traversing the waveguide upon destruction). In embodiments of reversible blades of the disclosed technology, the second aperture 32 of the spacer may receive a second copper tube in the second wear area, to receive a second fiber optic waveguide. As with the other tubes 11, the apertures of the spacers can support the copper tube(s) during molding, and prevent bending or deforming of the same.

The spacers 3 may be made from a phenolic material, an alloy (e.g., steel, aluminum, titanium), or a composite material (e.g., carbon fiber, fiberglass). A particularly useful material for making the spacers of the disclosed technology is a melamine-faced solid phenolic laminate impregnated with thermosetting resins, sold under the trademark Arboron®.

Figure 4B:
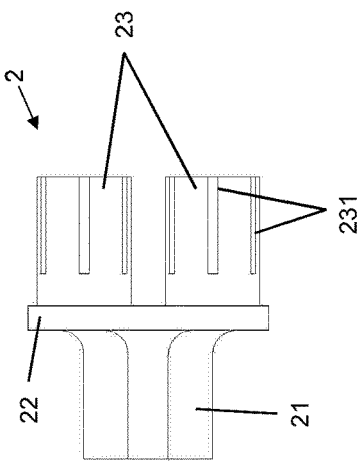
FIG. 4B shows a side view of the embodiment of the end mount of FIG. 4A.
Figure 4A:
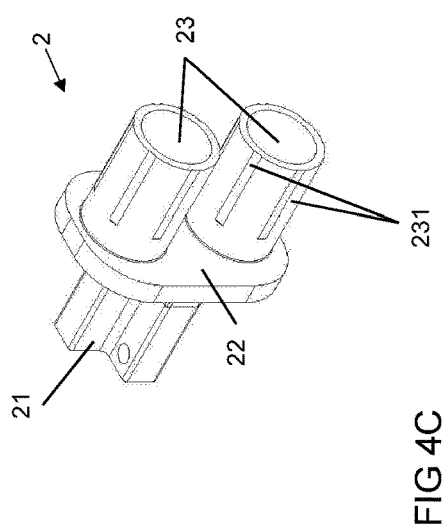
FIG. 4A shows a perspective view of an embodiment of an end mount useful in the disclosed technology.
Figure 4C:
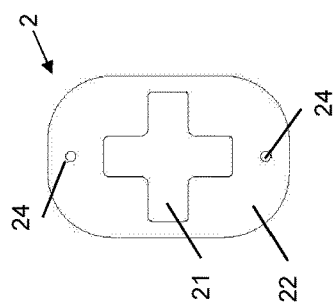
FIG. 4C shows an end view of the embodiment of the end mount of FIG. 4A.

As shown in FIGS. 4A, 4B and 4C, the end mounts 2 of the scraper blade include a plate 22. In the embodiment shown, a pair of bosses 23 are affixed to or integral with, and protrude from, an interior surface of the plate 22, sized to be received in a corresponding vacuous area at the ends of the core tubes. The bosses may be hollow, may have a circular circumference, and may have a length of about 1.25"-2.25" from the interior surface of the plate. Channels 231 may be formed on an exterior surface of the bosses, extending from the ends of the bosses along a portion of a length of the bosses (such as, for example, 1.25"-2.25") to receive and increase structural adhesive strength between the bosses and the tubes. The channels may have a depth of about 0.0125". The adhesive used to secure the bosses within the ends of the tubes may be heat activated, actively bonding the bosses to the tubes when the elastomeric body is being molded onto the core. Alternatively, the end mounts can be secured to the core after the molding process, using an epoxy or other adhesive.

A cross structure 21 may be affixed to or integral with, and protruding from, an exterior side of the plate 22 of the end mounts, to provide a positive mount for the blade to its holder in a conveyor belt system. Further, this cross structure 21 or similar structure provides a quick and easy orientation of reversible belt scraping blade so that the blade is positively located in its holder, and may be reoriented by 180 degrees by rotating the blade about the axis represented by the cross structures to present a new contact surface to the belt. This is a much less cumbersome process than flipping the blade about its long dimension.

The end mount plate 22 may also include one or more small air bleed holes 24 to allow expanding gas to escape from within the core region during the molding process, thereby preventing the adhesive from leaking out between the plate and the ends of the tubes.

The end mounts 2 may be made from steel, or from other alloys or materials.

Figure 2C:
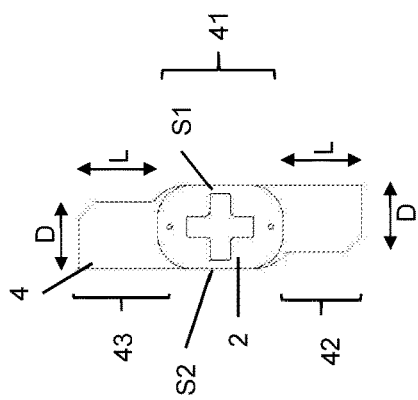
FIG. 2C shows an end view of the embodiment of the blade of FIG. 2A.
Figure 2A:
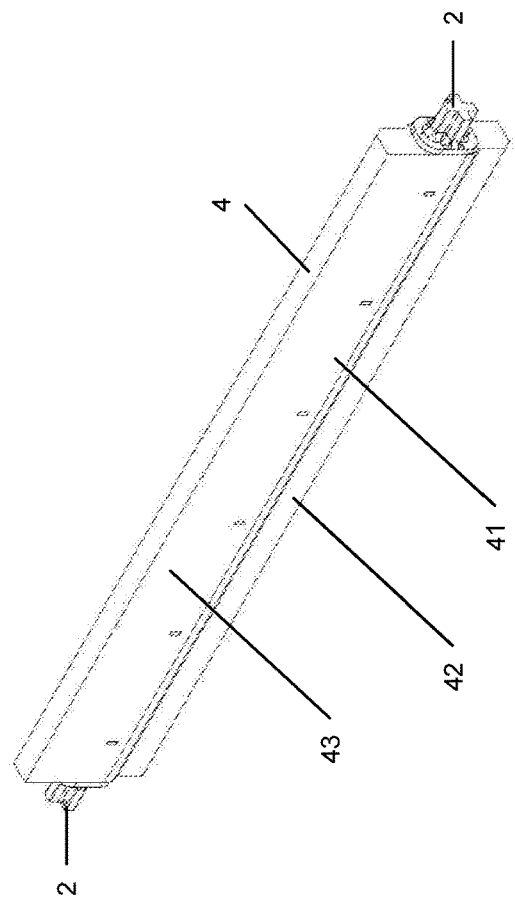
FIG. 2A shows a perspective view of an embodiment of the blade of the disclosed technology.
Figure 2B:
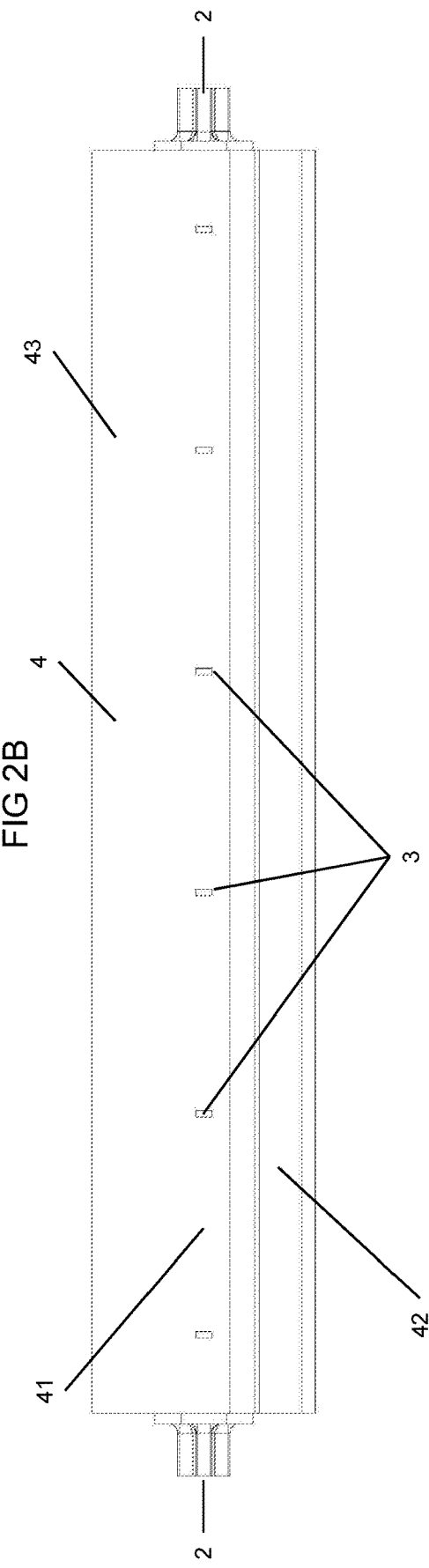
FIG. 2B shows a front view of the embodiment of the blade of FIG. 2A.

As hereinabove described, the elastomeric body 4 is molded about the tubes in its core region 41; the body further includes a first wear region 42 and, in some embodiments, a second wear region 43, joined by the core region. As shown in FIGS. 2A, 2B and 2C, the body surrounds the tubes 11 and fills the gaps between the tubes, extending about 0.375" beyond the tubes, on the sides of the body. The spacer tabs 33, when present, may extend to or through the surface of the elastomeric body. In the embodiment shown, the first wear region and the second wear region have a length L of between about 2" and 2.5", or 2.375", and extend from respective sides S1 and S2 of the core region, with a depth D smaller than the depth of the core region (e.g., the depth D of the wear regions may be 2", whereas the depth of the core region may be about 2.25").

Suitable materials for the elastomeric body include rubber, urethane, or other elastomers, and combinations of elastomers that may have different durometer values or hardness. The elastomeric body may include a face plate along the length of its wear regions, with a wear edge of tungsten carbide or similar abrasion resistant material, such as described in U.S. Pat. No. 6,695,123, incorporated herein by reference. Similarly, the elastomeric body may have a curved contour at its wear region(s), also as described in U.S. Pat. No. 6,695,123.

In an embodiment of the manufacture of a scraper blade of the disclosed technology, a pair of tubes 11 are provided in parallel arrangement within a mold, and elastomeric material is added to the mold and molded about the tubes to form a core region 41, and further forming at least one wear region (e.g., 42, 43) extending from the core region. In constructing scraper blades of the disclosed technology, the rubber molding process can put significant pressure (e.g., 300 psi) on the components in the mold, which can move or bend blade elements easily. The spacers 3 hereinabove described can be slid over the tubes and positioned along the length of the tubes prior to adding the elastomeric material, to keep the tubing properly positioned within the mold and eliminate any potential for bending. Further, one or more copper tubes may be provided, parallel with the tubes 11, and extending through and supported by the small apertures 32 of the spacers 3.

Positioning a tab of the spacer against the bottom surface of the mold further positions the tubes above the surface of the mold so that the elastomeric material can seep under the tubes to form a side of the core region. After the molding process, the spacers are held in place by the elastomeric material, and provide additional structure to cause the two tubes of the core to act together as one.

End mounts 2, such as those hereinabove described, may be secured to the ends of the tubes prior to adding the elastomeric material, to allow the scraper blade to be mounted on its holder in a conveyor belt system. To secure the end mounts to the tubes, adhesive (e.g., heat activated adhesive) may be added to bosses or other structure of the end mounts prior to coupling the same with the tubes. In an alternative embodiment, the end mounts 2 may be secured to the ends of the tubes after the molding process.

In this and other embodiments of the manufacture of a scraper blade, the mold may be a press mold. After the molding process, fiberoptic waveguides may be provided through the copper tubes, if any, to facilitate communication of wear on one or both sides of the blade.

The resulting product achieves significant weight reduction over the prior art, while maintaining the durability of the scraper blade. For example, using steel tubing in the core of the blade of the disclosed technology results in a weight reduction on average of about 29% over the same size scraper blade model B-48-ST-2080F-RW manufactured by Richwood Industries; using aluminum tubing results in a weight reduction on average of about 48% over the same Richwood model.

The invention claimed is:

1. A scraper blade for a conveyor belt system, the blade comprising:
   a. a pair of tubes, positioned in a parallel formation;
   b. a plurality of spacers positioned about the circumference of and along the length of the tubes, the spacers comprising a pair of vertically aligned apertures, each aperture receiving one of the tubes;
   c. a pair of end mounts, each of the end mounts comprising a plate with a pair of bosses affixed to or integral with an interior surface of the plate, the bosses being received in an end of each of the tubes; and
   d. an elastomeric body, wherein the tubes are integrally molded into a core region of the elastomeric body, the elastomeric body further comprising a first wear region, a second wear region and a core region joining said first wear region and said second wear region generally in opposition to each other.

2. The scraper blade of claim 1, wherein the spacers further comprise at least one straight edge tab protruding from a side thereof.

3. The scraper blade of claim 2, wherein the straight edge tab has a length of at least 0.375".

4. The scraper blade of claim 1, wherein the end mounts further comprise a cross structure protruding from an exterior side of the plate.

5. The scraper blade of claim 4, wherein the end mount plate further comprises one or more air bleed holes.

6. The scraper blade of claim 1, wherein the spacers are made from a phenolic material.

7. The scraper blade of claim 1, wherein the bosses of the end mounts have channels formed on an exterior surface thereof, extending from the ends of the bosses along a portion of a length of the bosses.

8. A scraper blade for a conveyor belt system, the blade comprising:
   a. a pair of tubes;
   b. a pair of end mounts coupled with the tubes to secure the tubes in a parallel arrangement; and
   c. an elastomeric body, wherein the tubes are integrally molded into a core region of the elastomeric body, the elastomeric body further comprising a wear region extending below the core region.

9. The scraper blade of claim 8, further comprising a plurality of spacers positioned about the circumference of and along the length of the tubes, the spacers comprising a pair of vertically aligned apertures, each aperture receiving one of the tubes.

10. The scraper blade of claim 9, wherein the spacers comprise at least one straight edge tab protruding from a side of the spacer.

11. The scraper blade of claim 10, wherein the spacers are made from a melamine-faced solid phenolic laminate impregnated with thermosetting resins.

12. The scraper blade of claim 9, wherein the spacers further comprise two straight edge tabs protruding from opposing sides of the spacer, and wherein the spacers are integrally molded within the elastomeric body so that only the tabs of the spacers are exposed on the surface of the elastomeric body.

13. The scraper blade of claim 8, wherein each of the end mounts comprises a plate with a pair of bosses protruding from an interior surface of the plate, the bosses being received in vacuous areas at ends of the tubes.

14. The scraper blade of claim 12, wherein the bosses of the end mounts have channels formed on an exterior surface thereof, extending from the ends of the bosses along a portion of a length of the bosses.

15. A method of manufacturing a scraper blade for a conveyor belt system, the method comprising:
   a. in a mold, providing a pair of tubes in parallel arrangement;
   b. adding elastomeric material to the mold; and
   c. molding the elastomeric material about the tubes to form a core region, and further forming at least one wear region extending from the core region.

16. The method of claim 15, further comprising the step of sliding a plurality of spacers having a pair of vertically aligned apertures along the length of the tubes, so that each tube is positioned within one of the apertures of the spacers, prior to the step of adding the elastomeric material to the mold.

17. The method of claim 16, wherein the spacers further comprise a tab extending from a side of the spacers, and wherein when the tubes and the spacers are provided in the mold, the tabs of the spacers are in contact with a bottom surface of the mold, supporting the tubes above the mold surface.

18. The method of claim 15, wherein the mold is a press mold.

19. The method of claim 15, further comprising the step of adding end mounts at the ends of the tubes, prior to adding the elastomeric material.

20. The method of claim 19, wherein the end mounts comprise a plate having a pair of bosses extending from an interior surface of the plates, the bosses being received within corresponding hollow ends of the tubes, the method further comprising the step of applying an adhesive to the bosses to cause the same to bond to the tubes.

* * * * *

UNITED STATES PATENT AND TRADEMARK OFFICE
CERTIFICATE OF CORRECTION

PATENT NO. : 11,377,305 B2
APPLICATION NO. : 16/920839
DATED : July 5, 2022
INVENTOR(S) : Christopher Scott Smith et al.

Page 1 of 1

It is certified that error appears in the above-identified patent and that said Letters Patent is hereby corrected as shown below:

In the Claims

In Column 6, Claim 14, Line 18, delete "12" and replace with --13--, therefor.

Signed and Sealed this
Seventh Day of March, 2023

Katherine Kelly Vidal
Director of the United States Patent and Trademark Office